US012036172B1

(12) United States Patent
Liu et al.

(10) Patent No.: US 12,036,172 B1
(45) Date of Patent: Jul. 16, 2024

(54) WATERPROOF STIMULATION DEVICE WITH CLOSED-SYSTEM PRESSURE BALANCE

(71) Applicant: HYTTO PTE. LTD., Singapore (SG)

(72) Inventors: Dan Liu, Guangdong (CN); Jilin Qiu, Guangdong (CN)

(73) Assignee: HYTTO PTE. LTD., Singapore (SG)

(*) Notice: Subject to any disclaimer, the term of this patent is extended or adjusted under 35 U.S.C. 154(b) by 0 days.

(21) Appl. No.: 18/400,273

(22) Filed: Dec. 29, 2023

(51) Int. Cl.
*A61H 19/00* (2006.01)
*A61H 23/02* (2006.01)

(52) U.S. Cl.
CPC ............. *A61H 19/44* (2013.01); *A61H 19/32* (2013.01); *A61H 19/34* (2013.01); *A61H 23/02* (2013.01); *A61H 2201/0107* (2013.01); *A61H 2201/0111* (2013.01); *A61H 2201/0207* (2013.01)

(58) Field of Classification Search
None
See application file for complete search history.

(56) References Cited

U.S. PATENT DOCUMENTS

| | | | | |
|---|---|---|---|---|
| 4,790,296 A * | 12/1988 | Segal | A61H 19/32 | 600/38 |
| 6,547,749 B2 * | 4/2003 | Hansen | F04B 45/043 | 601/149 |
| 7,572,240 B2 * | 8/2009 | Nan | A61H 19/44 | 601/99 |
| 9,119,765 B2 * | 9/2015 | Topolev | A61H 19/44 | |
| 9,339,434 B1 | 5/2016 | Mayfield | | |
| 9,717,845 B2 | 8/2017 | Fima | | |
| 10,561,572 B2 | 2/2020 | Fima | | |
| 10,940,076 B2 * | 3/2021 | Haddock | A61H 15/0085 | |
| 11,077,014 B2 | 8/2021 | Rossi | | |
| 2004/0147858 A1 * | 7/2004 | Lee | A61H 19/44 | 601/101 |
| 2014/0288364 A1 * | 9/2014 | St. Bernard | A61H 19/34 | 601/48 |
| 2016/0367431 A1 * | 12/2016 | Ferrari | A61H 19/44 | |
| 2022/0257458 A1 * | 8/2022 | Dickinson | A61H 19/44 | |

(Continued)

FOREIGN PATENT DOCUMENTS

| | | |
|---|---|---|
| CN | 2728475 Y | 9/2005 |
| CN | 101574299 A | 4/2011 |

(Continued)

*Primary Examiner* — LaToya M Louis
(74) *Attorney, Agent, or Firm* — F. Chau & Associates, LLC

(57) ABSTRACT

A sexual stimulation device includes a housing, a drive unit at least partially disposed within the housing, a first stimulation element directly or indirectly coupled with the drive unit and driven by the drive unit to generate a movement, the movement configured to stimulate a sensitive area of a human body, an active stretchable seal configured to dynamically seal a relative movement part between the housing and the first stimulation element or the drive unit with respect to the housing, and to deform with the movement of the first stimulation element, and a passive stretchable element. The passive stretchable element is configured to deform passively due to the deformation of the active stretchable seal, thereby resulting in the dynamic balance of air pressure in an enclosed space at least defined by the passive stretchable element and the active stretchable seal.

17 Claims, 12 Drawing Sheets

(56) References Cited

U.S. PATENT DOCUMENTS

| | | | | |
|---|---|---|---|---|
| 2022/0257459 | A1* | 8/2022 | Dickinson .......... | A61H 23/0263 |
| 2023/0024137 | A1* | 1/2023 | Larkin .................. | A61H 19/44 |

FOREIGN PATENT DOCUMENTS

| | | | |
|---|---|---|---|
| CN | 203379600 | U | 1/2014 |
| CN | 204030838 | U | 12/2014 |
| CN | 205377554 | U | 7/2016 |
| CN | 205411598 | U | 7/2016 |
| CN | 206411596 | U | 8/2016 |
| CN | 109510383 | A | 3/2019 |
| CN | 110664603 | A | 1/2020 |
| CN | 210142956 | U | 3/2020 |
| CN | 210246520 | U | 4/2020 |
| CN | 211356652 | U | 8/2020 |
| CN | 214959108 | U | 11/2021 |
| CN | 215132896 | U | 12/2021 |
| CN | 216216324 | U | 4/2022 |
| CN | 114094758 | A | 5/2022 |
| CN | 217029844 | U | 7/2022 |
| CN | 217216255 | U | 8/2022 |
| CN | 217328331 | U | 8/2022 |
| CN | 109223496 | A | 8/2023 |
| JP | 2002291829 | A | 10/2002 |

* cited by examiner

WATERPROOF STIMULATION DEVICE WITH CLOSED-SYSTEM PRESSURE BALANCE

TECHNICAL FIELD

The present disclosure relates to stimulation devices and, more specifically, to waterproof stimulation devices with closed-system pressure balancing.

DISCUSSION OF THE RELATED ART

Sexual stimulation devices are devices that are used to stimulate the erogenous zones of users by the application of various sensation in the form of vibration, reciprocation, rotation, suction, etc. These devices may have movable parts that are sealed within a waterproof skin. However, as these devices are set in use, they may change in volume, for example, when the device makes a reciprocating motion. The change in volume within the waterproof skin may generate a pressure gradient with respect to the ambient pressure and this pressure gradient is often released by the use of air holes or valves so as to ensure smooth operation of the device.

However, these airholes or valves may create a weak point in the device's waterproofing and may allow water to be drawn into the device therethrough, which may contaminate and deteriorate sensitive internal components. These airholes or valves are generally located close to the reciprocating element so that they can create a direct path into the reciprocating element so as to let in air as the reciprocating element is extended and to release air as the reciprocating element is retracted.

SUMMARY

A sexual stimulation device includes a housing, a drive unit at least partially disposed within the housing, a first stimulation element directly or indirectly coupled with the drive unit and driven by the drive unit to generate a movement, the movement configured to stimulate a sensitive area of a human body, an active stretchable seal configured to dynamically seal a relative movement part between the housing and the first stimulation element or the drive unit with respect to the housing, and to deform with the movement of the first stimulation element, and a passive stretchable element. The passive stretchable element is configured to deform passively due to the deformation of the active stretchable seal, thereby resulting in the dynamic balance of air pressure in an enclosed space at least defined by the passive stretchable element and the active stretchable seal.

A sexual stimulation device includes a housing, a drive unit at least partially disposed within the housing, a first stimulation element directly or indirectly coupled with the drive unit and driven by the drive unit to generate a movement, the movement configured to stimulate a sensitive area of a human body, and a removable attachment having a second stimulation element coupled with the first stimulation element and configured to reciprocate with a reciprocating movement of the first stimulation element.

A sexual stimulation device includes an active stretchable seal disposed at a first end of a body portion, the active stretchable seal creating a pressure as it moves. A drive unit moves the active stretchable seal. A passive stretchable element is disposed at a second end of the body portion. A pressure pathway carries the pressure created by the active stretchable seal to the passive stretchable element such that the total pressure within the active stretchable seal, passive stretchable element, and the pressure pathway stays relatively stable as the active stretchable seal moves.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
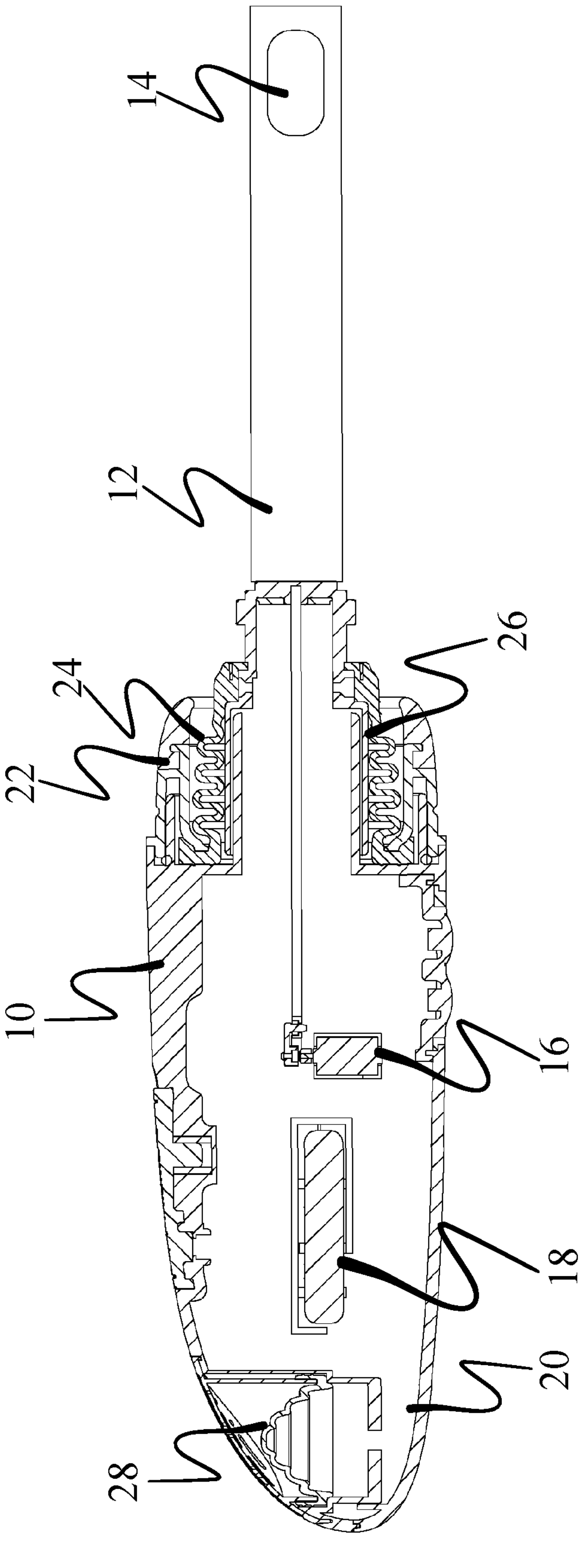
FIG. 1 is a cutaway view of a sexual stimulation device in accordance with exemplary embodiments of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present disclosure provide sexual stimulation devices that include a mechanism to balance internal pressure therein without compromising waterproofing. Rather than providing a vent hole that allows air to flow directly in and out of an active stretchable seal such as a reciprocating element, exemplary embodiments of the present disclosure provide a pathway for pressure to be balanced between the active stretchable seal that drives the motion of the stimulation device and a secondary passive stretchable element, which can be a passive stretchable element such as a flexible capsule, or a flexible wall, or an airbag including a certain amount of gas therein, disposed apart from the active stretchable seal. The secondary passive stretchable element is configured to enlarge as the active stretchable seal contracts and contract as the active stretchable seal enlarges. The pressure pathway between the active stretchable seal and the secondary passive stretchable element allows for the two elements to be part of a closed system with a constant pressure throughout.

For example, the active stretchable seal may be disposed close to a front end of the stimulation device and the secondary passive stretchable element may be disposed close to a back end of the stimulation device and the pathway may traverse the interior of the stimulation device. As the secondary passive stretchable element may itself expand and contract, and this secondary passive stretchable element may also be disposed within a casing of the stimulation device, a vent may be used to normalize pressure at the back end of the stimulation device so as to allow air to be pushed out from the casing as the secondary passive stretchable element expands and to allow air to be pulled into the casing as the secondary passive stretchable element contracts. Thus, there might still be a vent in use. However, this vent leads into a sealed compartment within the casing so even if fluid makes its way in through this vent, it is not able to enter the secondary passive stretchable element and therefore is not able to come into contact with any sensitive electronic or mechanical elements. Also, because this vent may be disposed on the back end of the stimulation device, fluid ingress is made less likely.

It is noted that while the active stretchable seal that drives the motion of the stimulation device may be an active element, which is to say, it may operate under the mechanical drive of a motor or other mechanism, the secondary passive stretchable element may be a passive element, which is to say, it does not operate by direct mechanical drive but rather it may expand and contract as a result of the pressure provided by the active stretchable seal, that travels through the pressure pathway. However, according to alternative embodiments, the secondary passive stretchable element may be the active element and the active stretchable seal, which drives the motion of the stimulation device, may be the passive element, being driven by the pressure created by the active secondary passive stretchable element.

Moreover, while the pressure pathway may include a tube or pipe element, this is not necessarily the case and the pressure pathway may be open within the internal cavity defined by the device body.

Additionally, while it is described above that the active stretchable seal, the secondary passive stretchable element, and the pressure pathway may be a closed system, i.e., not allowing any air to enter or exit the system, embodiments of the present disclosure are not necessarily limited thereto and there may be some degree of limited air transfer between this system and the ambient environment so as to allow the device to slowly normalize when brought into a low pressure or high pressure environment, such as when changing altitudes.

Thus, while various embodiments of the present disclosure are described herein, it is noted that the particular elements are offered as examples and the invention is not necessarily limited to having all of the various elements described herein. Rather, the various elements are described so as to provide examples of actual implementations of the described concept, which may include various ways to balance pressure within a sexual stimulation device.

FIG. 1 is a cutaway view of a sexual stimulation device in accordance with exemplary embodiments of the present disclosure. In this device, the stimulator appendage is a fixed element that is arranged in line with the handle portion. As can be seen from this figure, the device includes an outer housing 10 that defines an exterior thereof. One or more stimulator appendages may extend from the outer housing 10. For example, a first stimulator 12 may extend from the housing 10. The first stimulator 12 may be a reciprocating element that is capable of providing a thrusting motion as it moves outwardly and inwardly. At the far end of the first stimulator 12 may be a stimulation component 14. The stimulation component 14 may be a vibrating motor or some other element capable of providing stimulation.

Figure 2:
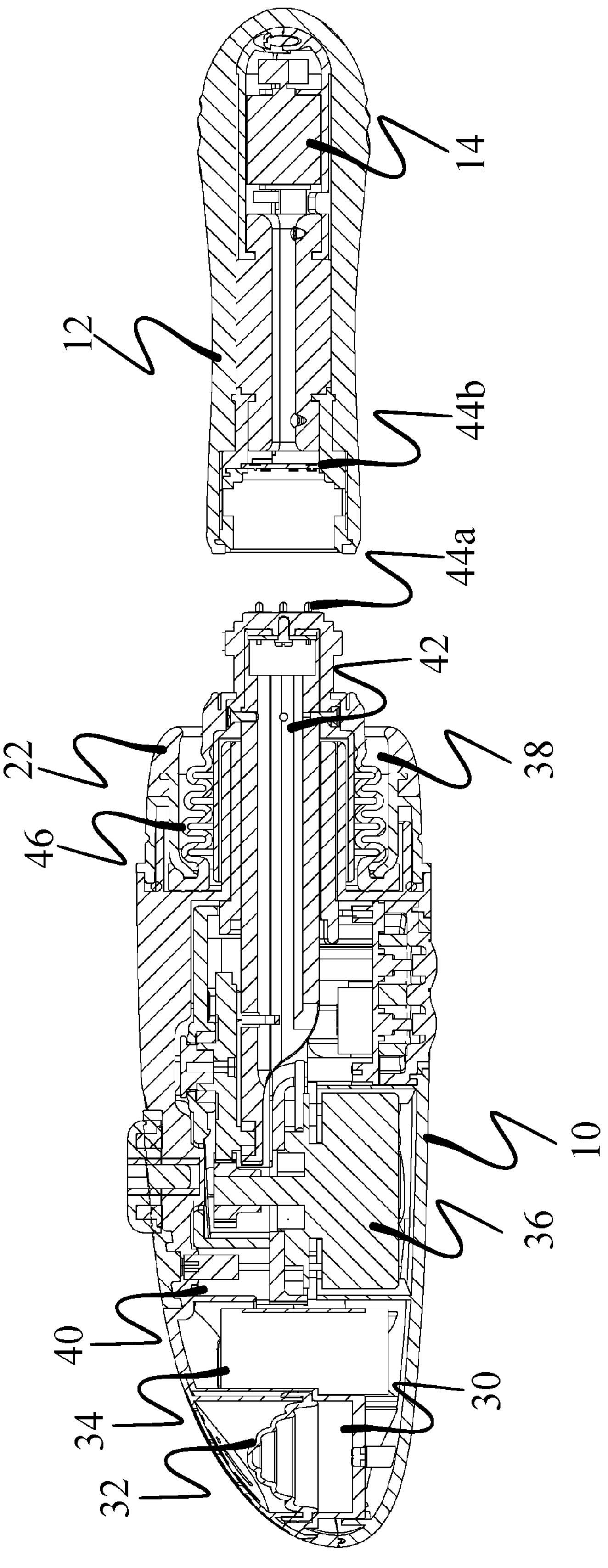
FIG. 2 is a cutaway view of a sexual stimulation device in accordance with exemplary embodiments of the present disclosure.

The reciprocating motion may be provided by a mover component 26 that is able to slide out and back under the action of a drive unit 16, which may include a motor and a mechanical linkage device. A stretchable sealer 24 may be used to ensure waterproofing across the mover component 26, for example, by providing a stretchable plastic element that may include bellows. An annular element 22 may be used to secure the stretchable sealer 24 to the housing 10. The relative moving part can be a portion between a mover component 26 and the housing, which exists as an air gap communicating with the interior of the housing 10, as shown in FIGS. 1 and 2, the air gap can be surrounded by the stretchable sealer 24, which may be a corrugated tube, for dynamic sealing. Furthermore, if the mover component 26 is a part of the first stimulator 12, then the relative moving part can be the air gap located between the first stimulator 12 and the housing 10.

The drive unit 16 may be powered by a power source such as a battery 18 and power conducting lines or wires may be used to deliver the power from the battery 18 to the drive unit 16. A controller may also be connected to the battery 18 and the drive unit 16 so as to control the operation of the drive unit 16.

As mentioned above, the drive unit 16 may drive the mechanical linkage to extend and retract the mover component 26. This may create pressure gradients within the housing 10 as the mover component 26 extends and retracts. For example, the extension of the mover component 26 may create a low pressure within an interior cavity 20 of the housing 10 that may be communicated to a passive stretchable element 28, which may function as the above-mentioned secondary passive stretchable element. In this way, the interior cavity 20 functions as the above-mentioned pressure pathway.

As the low pressure of the interior cavity 20 acts upon the passive stretchable element 28, the passive stretchable element 28 is made to contract. Air may then be permitted to enter into the housing 10 at an opening proximate to the passive stretchable element 28, but this section of the interior is hermetically sealed from the remainder of the interior cavity 20, and thus, even if water is to be pulled in through this opening, it cannot travel to the reminder of the interior cavity 20.

Additionally, as the mover component 26 retracts, high pressure is created within the interior cavity 20 and this may cause the passive stretchable element 28 to inflate within its space.

The stimulator appendage may be removable so as to allow for the use of multiple different stimulator appendages or to otherwise change the stimulator appendage that is in use. FIG. 2 is a cutaway view of a sexual stimulation device in accordance with exemplary embodiments of the present disclosure. In this device, the stimulator appendage is in line with the handle but is also removable. This figure illustrates the device with the stimulator appendage in a removed state.

The stimulator appendage may be a first stimulator 12 and may include a stimulation component 14. It is to be understood that within the present specification and the associated figures, like reference numerals may be used to describe like elements and thus, the stimulation component 14 (and other components) may be similar to that described above with respect to FIG. 1.

To power the stimulation component 14, electricity may be provided from the power source 34, which may be a battery 18, through a pair of electrically conductive contacts 44 with a first set of electrically conductive contacts 44*a* on the handle of the device making contact with a second set of electrically conductive contacts 44*b* on the first stimulator 12. The bellows 46 that may be locked in place by the annular element 22 or by a combination of the fixed retainer ring 94 and an element of the faceplate 50.

The gap 38 is defined by the annular element 22 and the outer side of the bellows 46. By enclosing the bellows 46 with the annular element 22, it prevents the bellows 46 from pinching the user's skin or body hair during contraction and expansion. A wire groove tube 42 may be part of the linkage element discussed above and may also serve as the aforementioned pressure pathway so as to communicate pressure to an enclosed space 40 of the housing 10 which may transfer pressure to a chamber 30 that the flexible capsule 32 is connected so that the flexible capsule 32 functions as the aforementioned secondary passive stretchable element.

The wire groove tube 42 may also function as the mechanical linkage transmitting motion from the motor 36 to the mover component 26.

Figure 3:
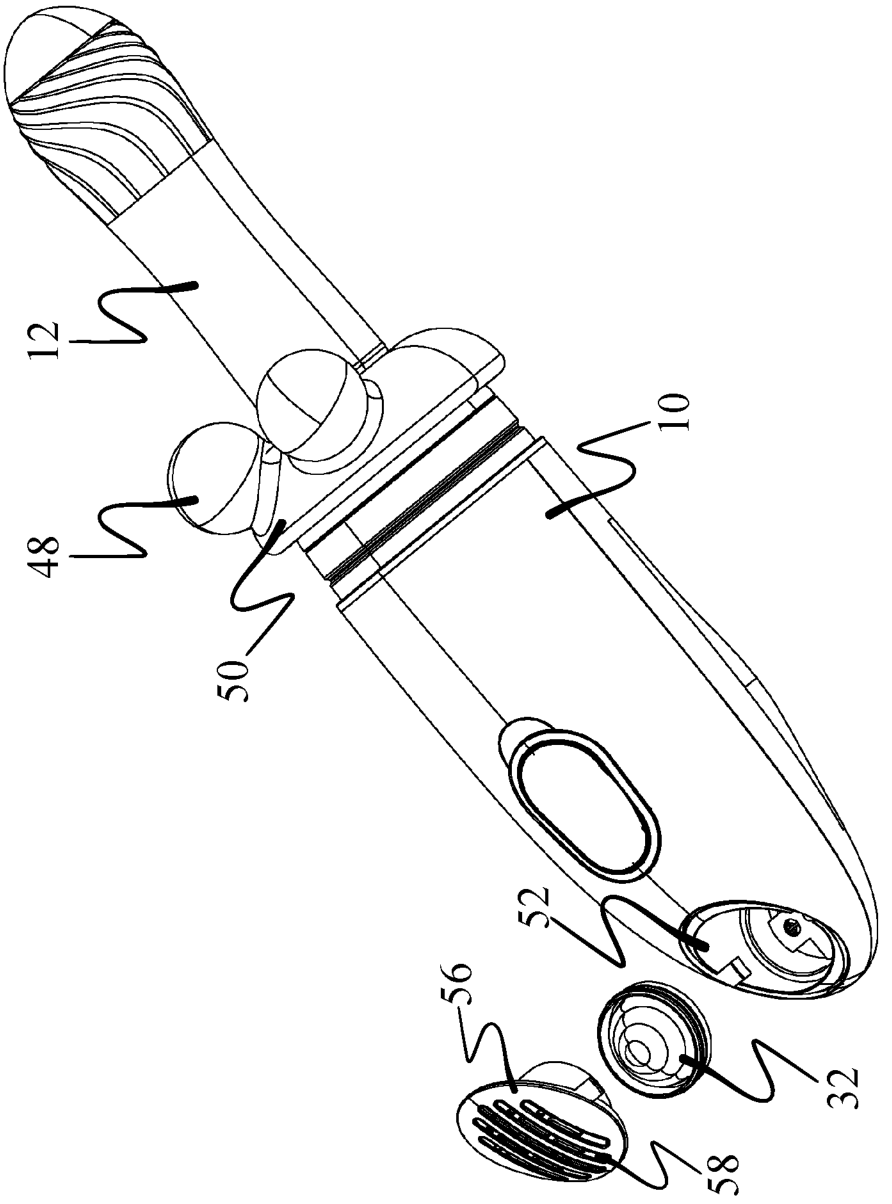
FIG. 3 is a perspective view of a sexual stimulation device having two stimulators in accordance with exemplary embodiments of the present invention.

As described above, exemplary embodiments of the present disclosure may utilize multiple stimulators such as a first stimulator 12 and a second stimulator 48. FIG. 3 is a perspective view of a sexual stimulation device having two stimulators in accordance with exemplary embodiments of the present invention. As can be seen from this figure, in addition to the first stimulator 12, a second stimulator 48 may be present. A securing ring 80 may be attached to the second stimulator 48 so that the entire assembly may be removed and replaced or reattached.

The housing 10 may have an opening over the flexible capsule 32 which is shown, together with a cover 56, in an exploded fashion. The flexible capsule 32 may inflate and deflate in response to the pressure but may at all times be contained within the hermetically sealed portion of the housing 10. The cover 56 may lock in place with a groove 52 in the housing 10. In this way, the cover 56 may be removable for cleaning and then reattached for use.

When in use, air may travel in and out though openings in the cover than may be referred to herein as breathers 58. The breathers 58 may be open vents or may have a membrane or seal to allow the passage of air therethrough while keeping out liquid.

Figure 4:
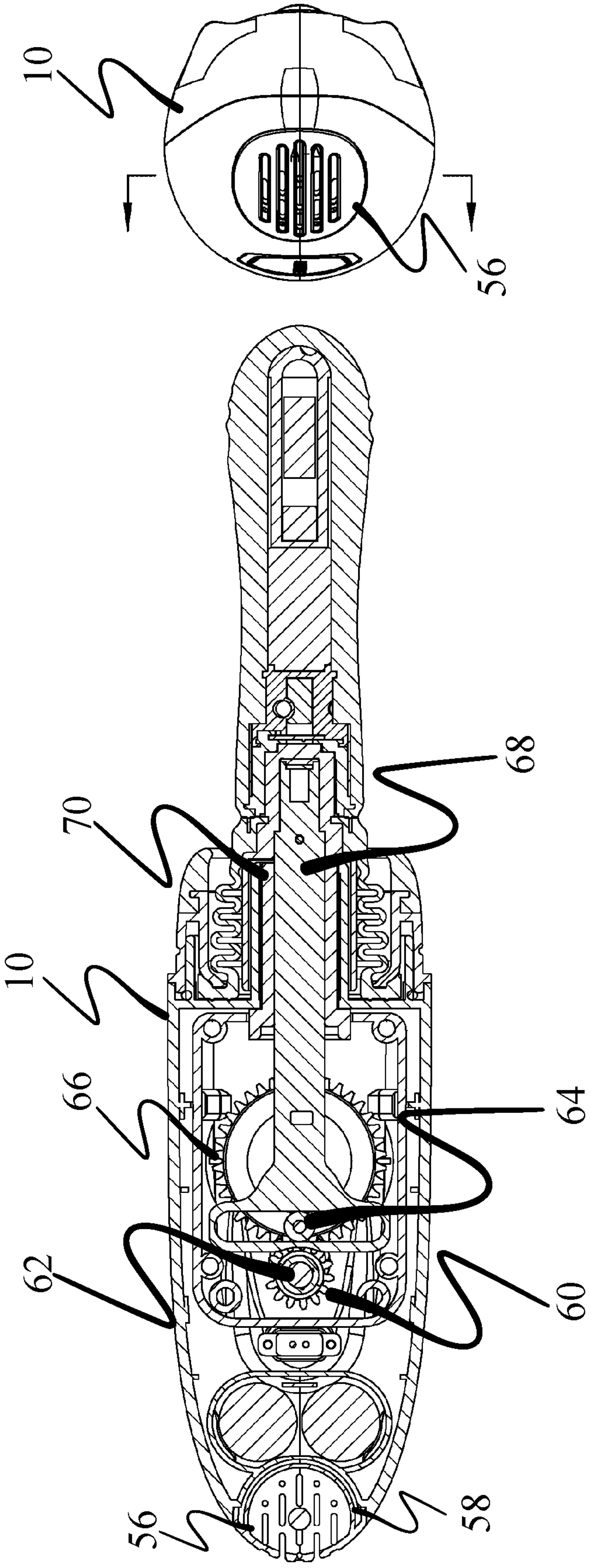
FIG. 4 is a cutaway view of a sexual stimulation device in accordance with exemplary embodiments of the present disclosure.

FIG. 4 is a cutaway view of a sexual stimulation device in accordance with exemplary embodiments of the present disclosure. To the right of the cutaway view is a bottom-up plan view. This figure shows the linkage mechanism for generating reciprocating motion from the motor 36. In this approach, the motor 36 has an output shaft 62 which turns a first gear 60. The first gear 60 turns a second gear 66. A slide 64 is disposed on the second gear 66 and as the second gear 66 turns, the slide 64 traces a circle. The slide 64 is disposed within a slot of a connecting rod 68 and so as the slide traces its circle, the connecting rod 68 moves up and down in a reciprocating fashion.

The connecting rod 68 is inhibited from lateral movement by a guide 70 and so the connecting rod 68 is forced into its reciprocating motion as the slide 64 moves laterally within the slot of the connecting rod 68 as it pushes and pulls the connecting rod 68 in its reciprocating motion.

The image to the right shows the bottom-up plan view of the sexual stimulation device. From this perspective, the cover 56 may be visible. This cover 56 includes the breather and may be removed to expose the flexible capsule 32 and to clean the space between the cover 56 and the flexible capsule 32.

Figure 5:
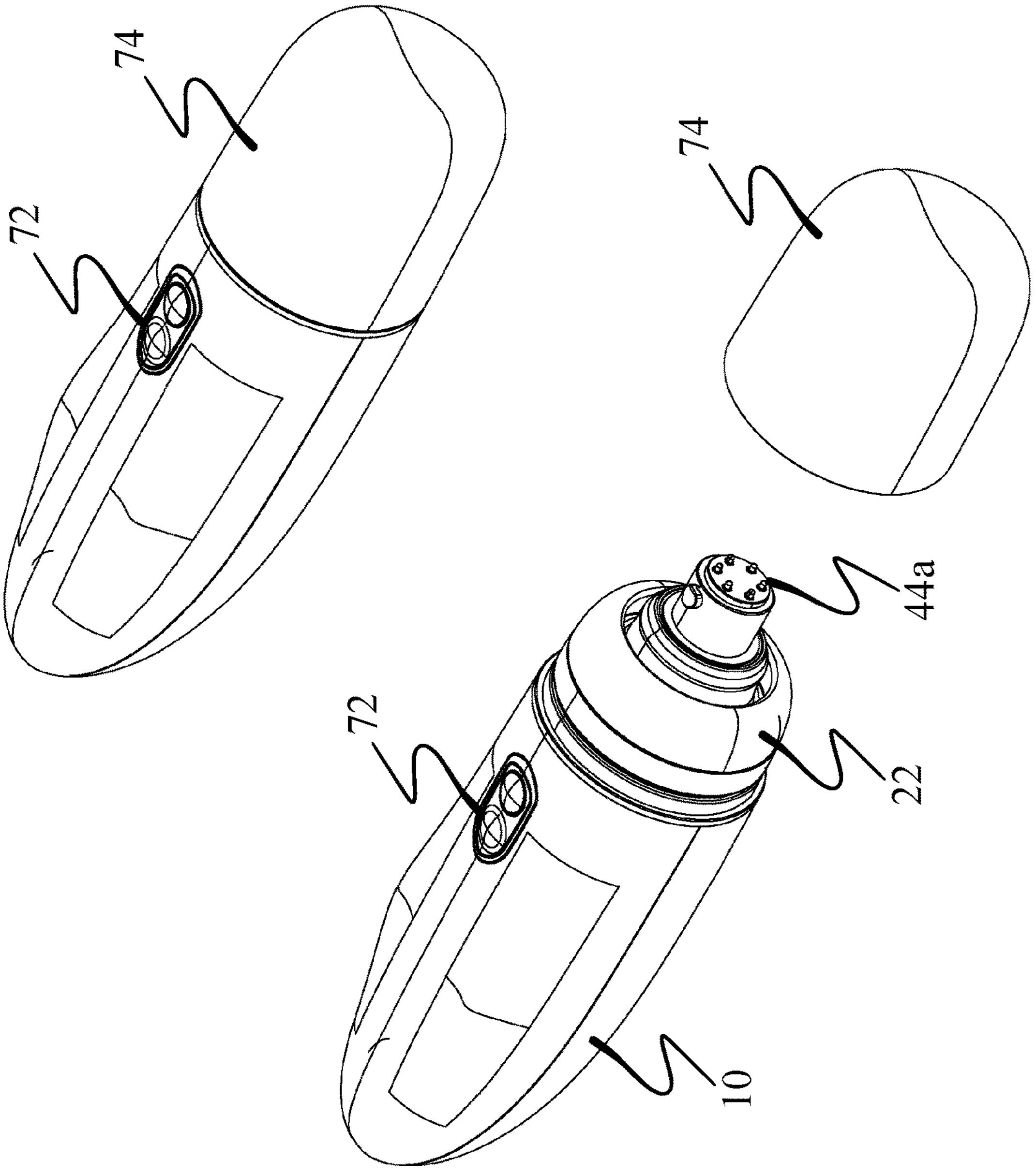
FIG. 5 is a perspective view of a sexual stimulation device in accordance with exemplary embodiments of the present invention.

FIG. 5 is a perspective view of a sexual stimulation device in accordance with exemplary embodiments of the present invention. In this arrangement, the stimulation component 14 is removed from the housing 10 and a protective cap 74 is placed over the connection element. One or more control buttons 72 are visible on the surface of the housing 10. The control buttons 72 may be used to activate and deactivate the device and/or to provide other controls such as speed control, motion control, activation of the stimulation component, etc.

When the cap 74 is removed, the annular element 22 may be revealed as well as the electrically conductive contacts 44*a*.

Figure 6:
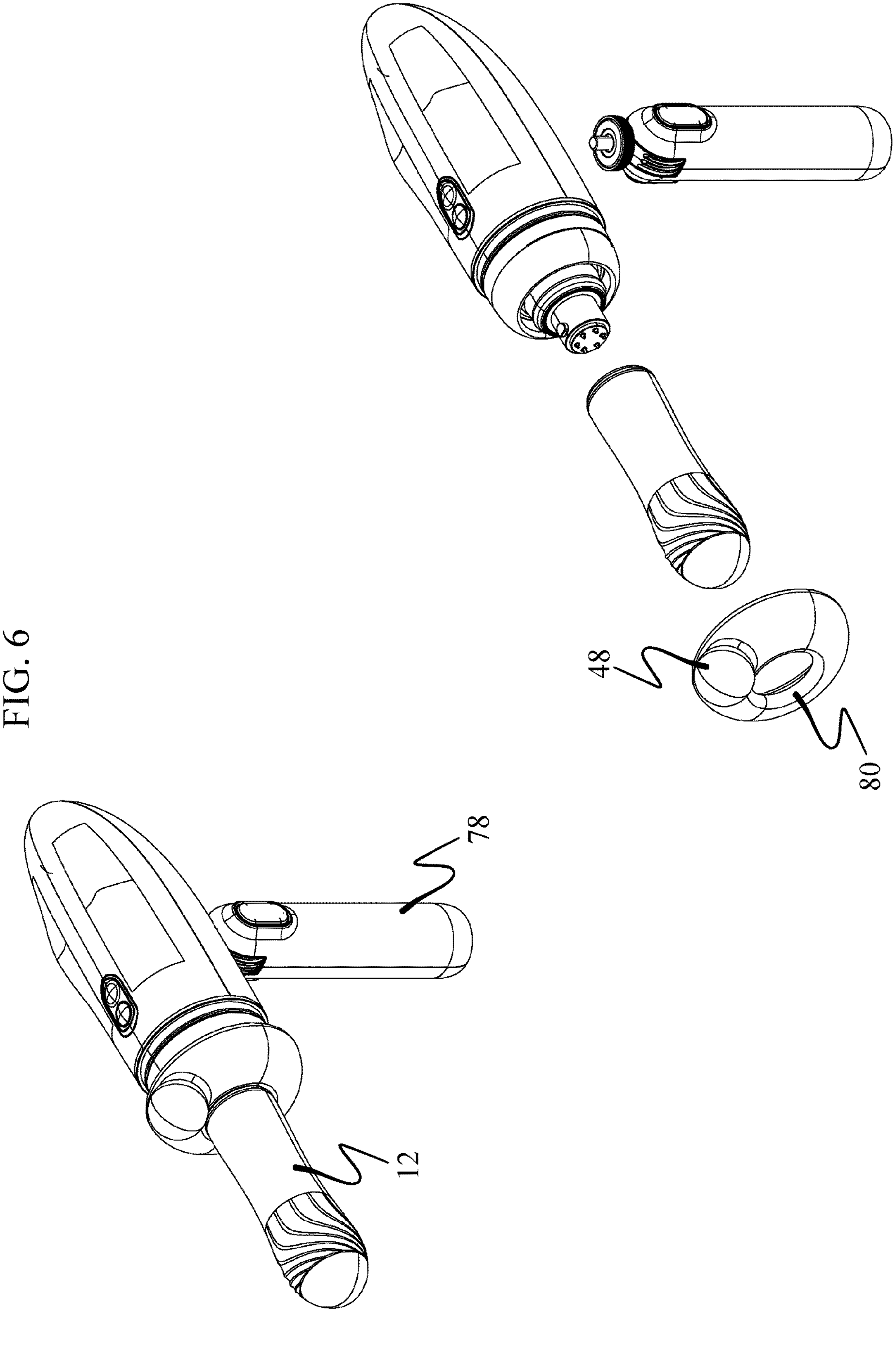
FIG. 6 is a perspective view of a sexual stimulation device having a handle element in accordance with exemplary embodiments of the present disclosure.

FIG. 6 is a perspective view of a sexual stimulation device having a handle element in accordance with exemplary embodiments of the present disclosure. As can be seen in this figure, the first stimulator 12 is disposed on a base portion that it is aligned with, i.e., both the first stimulator 12 and the base portion extend in the same direction and are arranged end-to-end. A handle portion 78 is then rotatably connected to the base portion. The second stimulator 48 is disposed at the base-facing end of the first stimulator 12. The second stimulator 48 may be removable from the first stimulator 12 and may affix thereto with the aid of a securing ring 80. The handle portion 78 may further be removably connected to the base and a hinge may be incorporated into the handle portion 78 to allow for the handle portion 78 to be angled, with respect to the base portion, to a desired and comfortable extent.

The cover 56 and breather 58 may be disposed at a back end of the base or may be disposed on a back end of the handle portion 78. Where the cover 56 and breather 58 are disposed at the back end of the handle portion 78, the pressure pathway may continue from the base to the handle portion 78.

Figure 7:
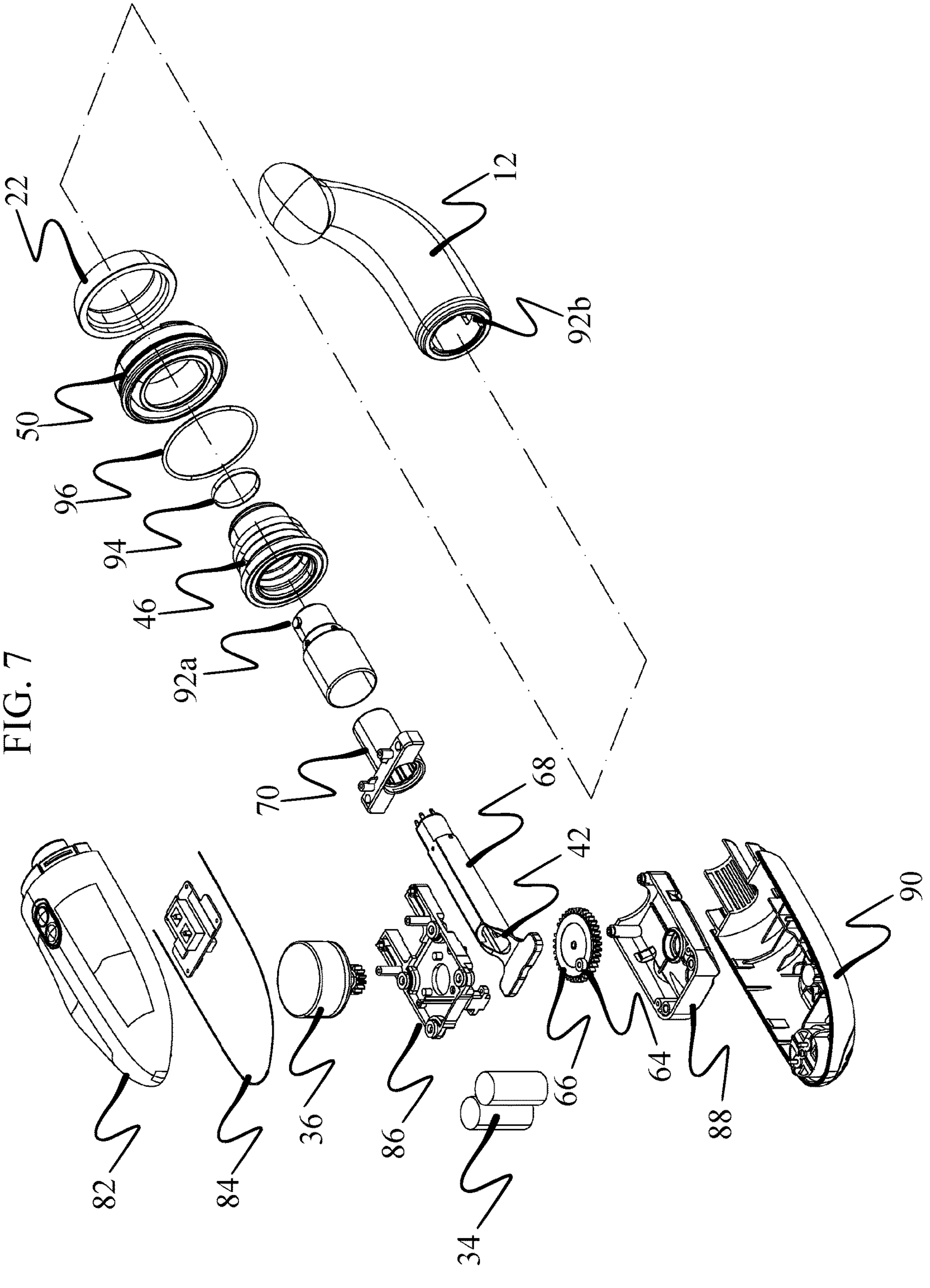
FIG. 7 is an exploded top-down view illustrating a sexual stimulation device in accordance with exemplary embodiments of the present disclosure.
Figure 8:
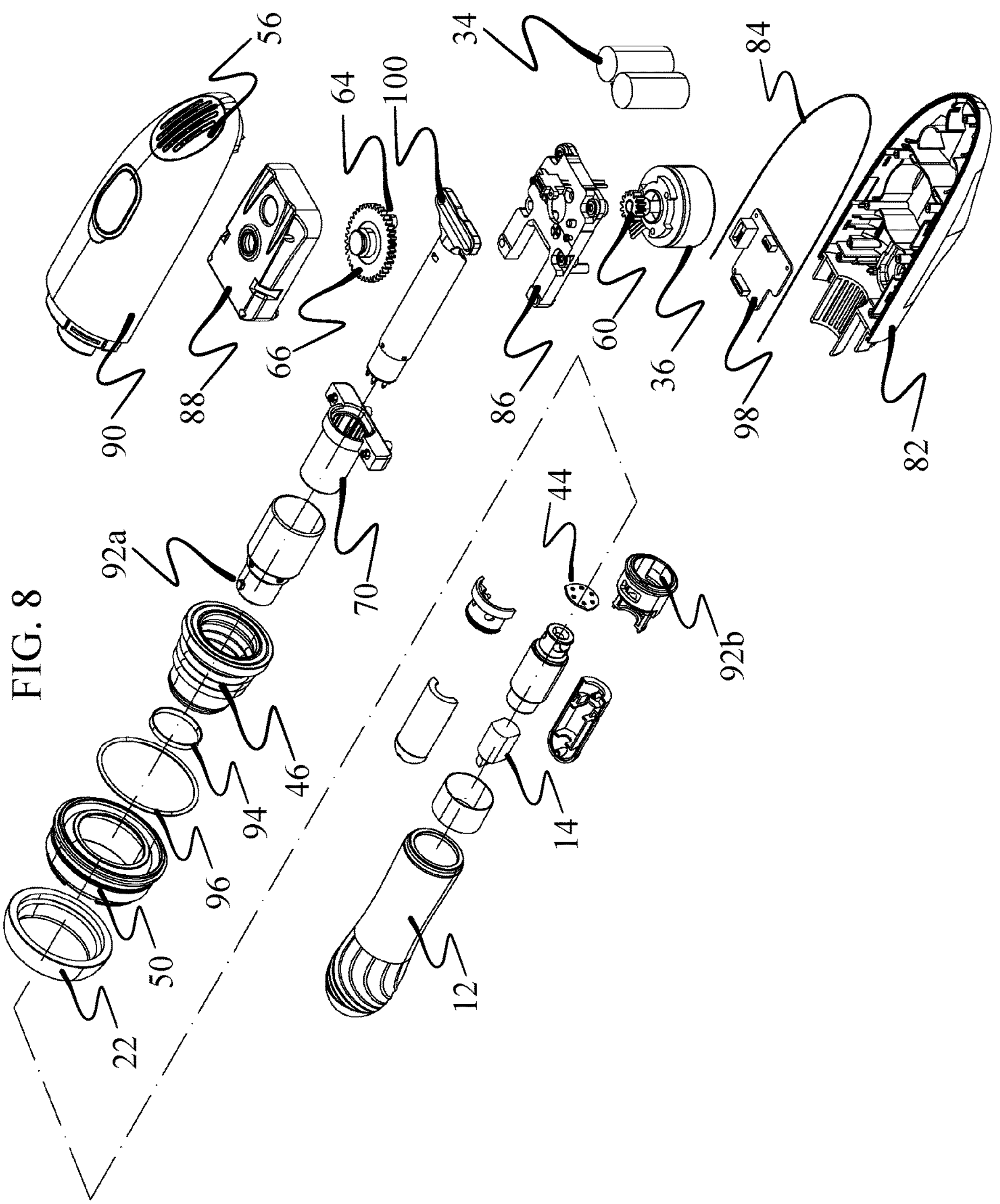
FIG. 8 is an exploded bottom-up view of a sexual stimulation device in accordance with exemplary embodiments of the present disclosure.

FIG. 7 is an exploded top-down view illustrating a sexual stimulation device in accordance with exemplary embodiments of the present disclosure and FIG. 8 is an exploded bottom-up view of the same. In these figures, it can be appreciated that the housing 10 includes an upper housing 82 and a lower housing 90, which may come together with a sealing strip 84 disposed therebetween to make a watertight connection, which may be a U-shaped element. A printed circuit board (PCB) 98 may be disposed within the housing 10, so as to control the operation of the device and one or more integrated circuits or other circuit elements may be disposed on the PCB 98.

The motor 36, having a first gear 60 attached to its output shaft 62 may be disposed within a motor bracket 86 such that the first gear 60 engages with the second gear 66 with the slide 64 of the second gear 66 disposed within the slide groove 100 of the connecting rod 68. The second gear 66 may be disposed within a gear cover 88 that the second gear 66 may rotate within.

The motor 36 may receive power from the power source 34 and may operate under the control of the controller that may be embodied by the PCB 98.

The connecting rod 68 may be restricted from lateral motion by the guide 70 such that the connecting rod 68 moves in a reciprocating fashion as a result of the movement of the motor 36. As the first stimulator 12 is removable, a quick linkage element may be used to facilitate the connection and disconnection and carry power thereacross. The quick linkage element may include a first portion 92*a* affixed to the body and a second portion 92*b* affixed to the first stimulator 12.

As shown in FIG. 7, within the connecting rod 68, there is an internal wire groove tube 42. The wire groove tube 42, located at one end within the housing 10, has an outlet for leading a wire connected to the first electrically conductive contact 44*a* out of the housing 10. The outlet is sloped to prevent the wire from being pulled during the reciprocating movement of the connecting rod 68.

Bellows 46, that may be made of a flexible and waterproof material such as silicone, may cover the guide 70 and connecting rod 68, such that the body may remain waterproof even as the connecting rod 68 extends and retracts. The bellows 46 may be held in place by a retainer ring 94. Sealings 96 may be used to maintain a good waterproof seal between the housing 10 and the faceplate 50.

The annular element 22 may cover the retainer ring 94 and may link with the faceplate 50 so as to hold it in place during use.

Electrically conductive contacts 44 may be disposed within the quick linkage 92*a/b* so as to facilitate the transmission of electricity from the body to the first stimulator 12 so as to deliver power to the stimulation component 14, which may be disposed in a front end of the first stimulator 12. The first stimulator 12 may be fashioned to have any desired shape and different first stimulators 12 may be attached to the base, as desired. FIG. 7 shows one exemplary shape for the first stimulator 12 and FIG. 8 shows another exemplary shape for the first stimulator 12, however, other shapes may also be used within the spirit and scope of the present disclosure.

Figure 9:
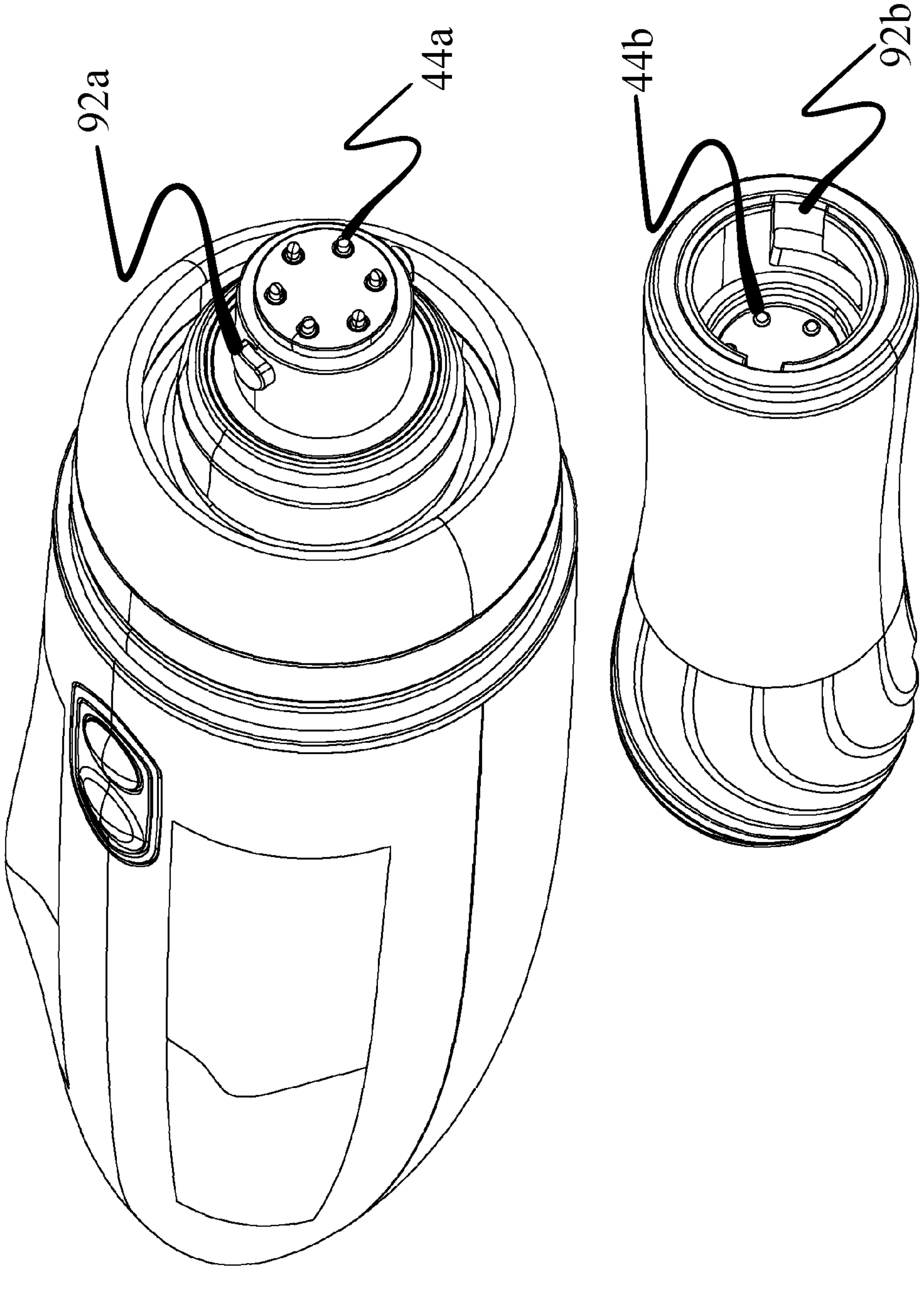
FIG. 9 is a perspective view illustrating a sexual stimulation device in accordance with exemplary embodiments of the present disclosure.

FIG. 9 is a perspective view illustrating a sexual stimulation device in accordance with exemplary embodiments of the present disclosure. In this figure, the first stimulator 12 is shown in a disconnected state so that the means of connection may be appreciated. The electrical connection between the body and stimulator 12 is made by the aforementioned electrically conductive contacts 44 including a first contact 44*a* disposed on the body and a second contact 44*b* disposed on the stimulator 12. The contacts 44*a/b* are arranged to engage with one another in the connected state.

The physical connection between body and stimulator 12 is maintained by the quick linkage assembly 92 including the first linkage 92*a* disposed on the body and the second linkage 92*b* disposed on the stimulator 12. The first linkage 92*a* may be a protrusion and the second linkage 92*b* may be a channel for receiving the protrusion, but this is only an example and other arrangements may be used including mechanical arrangements and magnetic arrangements for holding the stimulator 12 in place.

Figure 10:
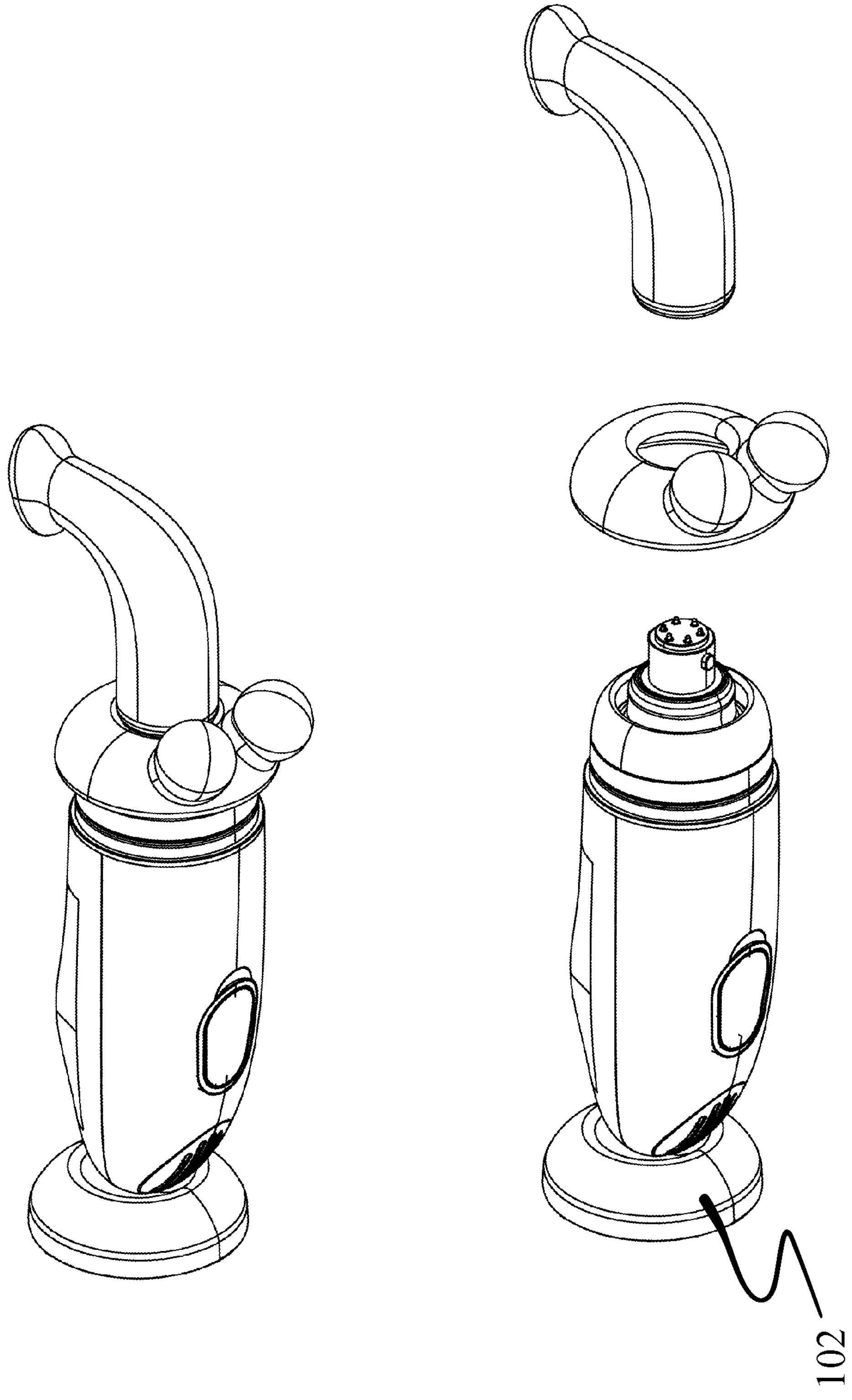
FIG. 10 is a perspective view of a sexual stimulation device including an element on the far end of the base in accordance with exemplary embodiments of the present disclosure.

The sexual stimulation device may further include an element disposed on the far end of the base. FIG. 10 is a perspective view of a sexual stimulation device including an element on the far end of the base in accordance with exemplary embodiments of the present disclosure. This element may be a sucker element 102 configured to apply an intermittent negative pressure. The negative pressure may be provided by the breather 58. As can be appreciated from this figure, the second stimulator 48 may be disposed on the removable base and together these elements may be held in place by the engagement of the first stimulator 12 with the body through the quick linkage assembly 44.

Figure 11:
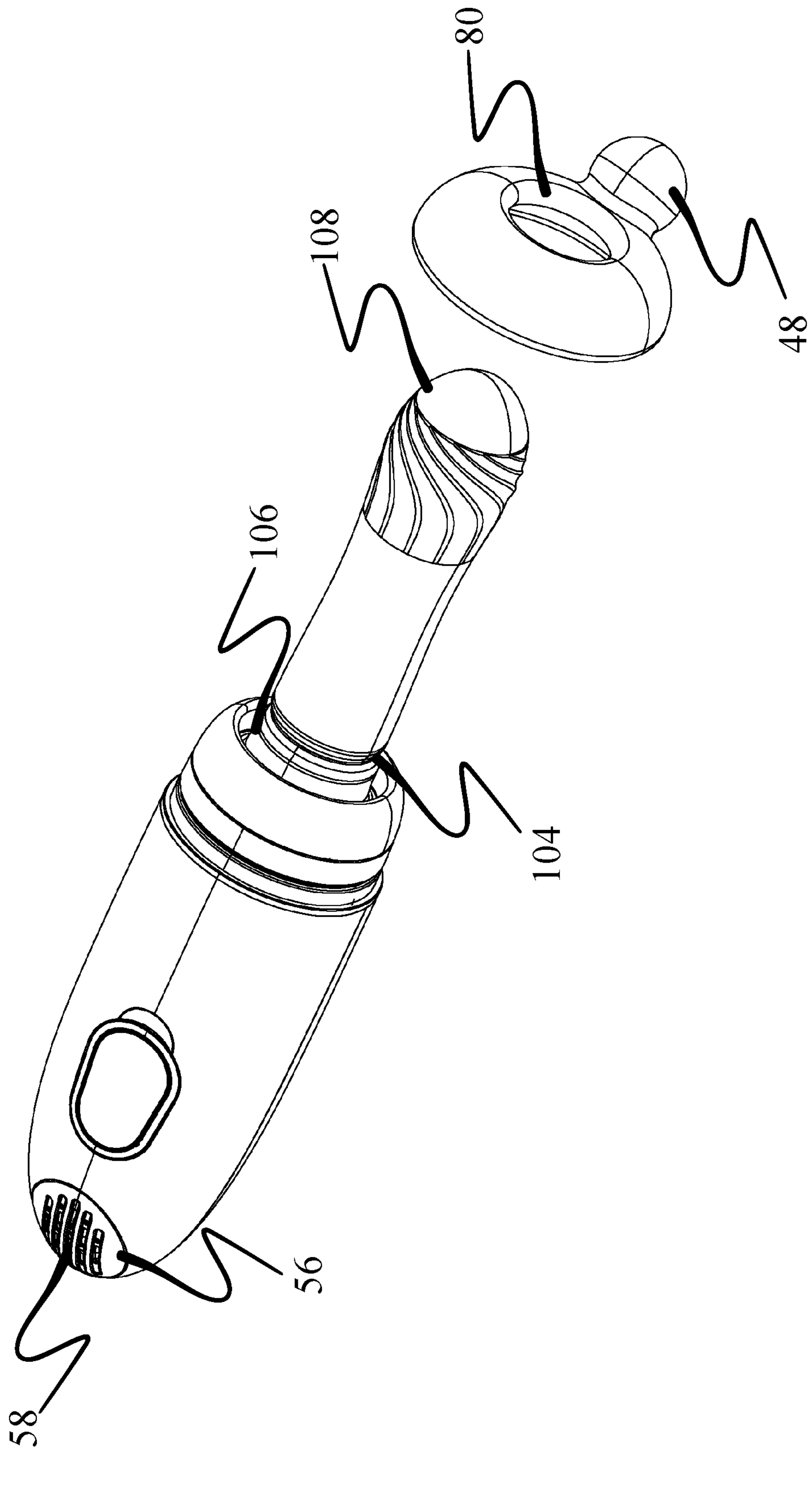
FIG. 11 is a perspective view illustrating a sexual stimulation device in a disassembled state in accordance with exemplary embodiments of the present disclosure.

FIG. 11 is a perspective view illustrating a sexual stimulation device in a disassembled state in accordance with exemplary embodiments of the present disclosure. As can be seen from this figure, the first stimulator 12 may be a dildo coupled to a removable attachment. The dildo has a first end 106 and a second end 108. The first end 106 is coupled with the drive unit 16 and the second end 108 is configured to be inserted into, for example, a female user's vagina. The removable attachment is coupled between the first end 106 and the second end 108 of the dildo. The dildo further includes an annular concavity 104 surrounding an outer side wall proximate the first end 106. The removable attachment further includes a securing ring 80 corresponding to the annular concavity 104. Divided by the annular concavity 104, a diameter of a portion of the dildo located on a side where the first end is 106 located is greater than the diameter of a portion of the dildo located on a side where the second end 108 is located. The securing ring 80 has an interference fit with the portion of the dildo located on the side where the first end 106 is located as the removable attachment is coupled with the dildo. The second stimulator 48 may be connected to the faceplate 50, past the securing ring 80, and may include additional stimulation components or may simply offer passive stimulation by its shape.

Figure 12:
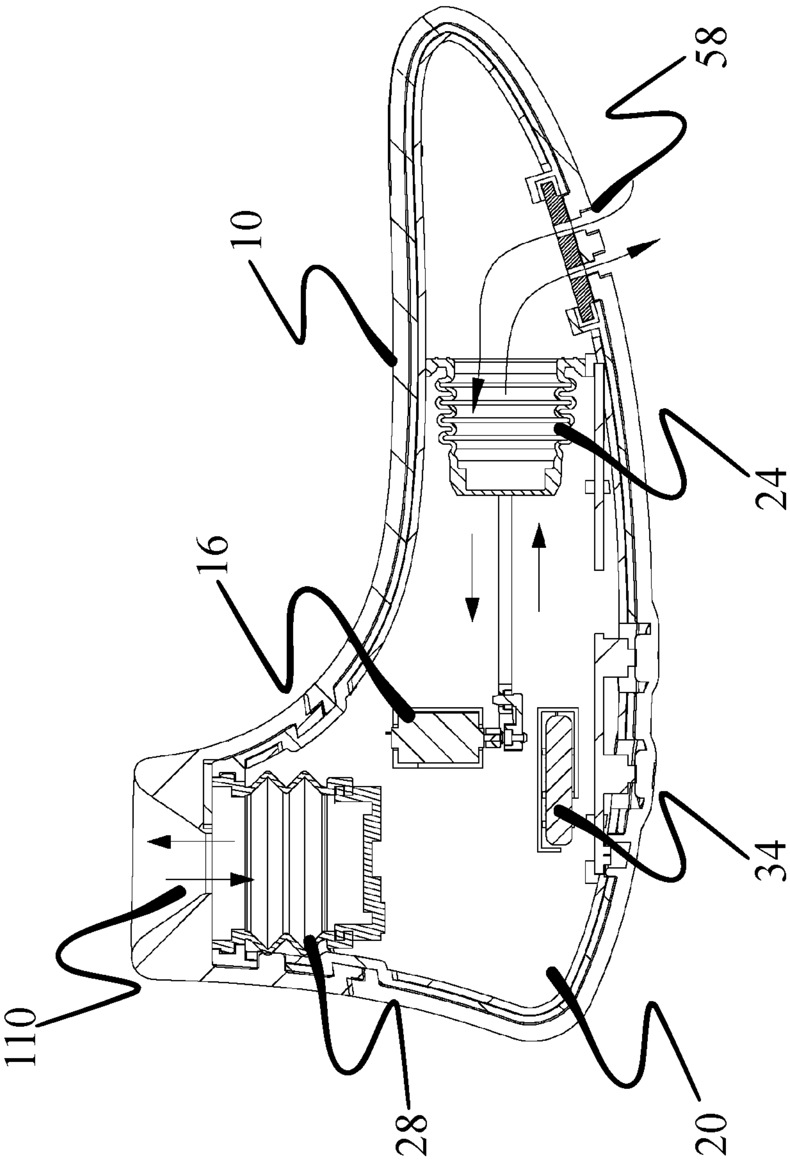
FIG. 12 is a cutaway cross-sectional view of a sexual stimulation device in accordance with exemplary embodiments of the present disclosure.

FIG. 12 is a cutaway cross-sectional view of a sexual stimulation device in accordance with exemplary embodiments of the present disclosure. As can be seen from this figure, here it is the stretchable sealer 24 of the secondary passive stretchable element that is actively driven by the drive unit 16. The stretchable sealer draws in and pushes out air though the breather 58 by the direct application of mechanical force of the drive unit 16 that is powered by the power source 34. The pressure pathway is defined within the interior cavity 20 of the housing 10 so as to passively move the passive stretchable element 28, which here delivers sexual stimulation to the user through an opening 110. Because the opening 110 and the passive stretchable element 28 are hermetically sealed from the interior cavity 20, there is no risk of liquid penetrating the interior cavity where it can damage the device. There is also no need to actively drive the passive stretchable element 28 as it may be passively operated by the communication of pressure thereto through the pressure pathway of the interior cavity 20.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A sexual stimulation device, comprises:

a housing, a drive unit at least partially disposed within the housing, a first stimulation element directly or indirectly coupled with the drive unit and driven by the drive unit to generate a movement, the movement configured to stimulate a sensitive area of a human body, an active stretchable seal configured to dynamically seal a relative movement part between the housing and the first stimulation element or the drive unit with respect to the housing, and to deform with the movement of the first stimulation element, and a passive stretchable element configured to deform passively due to the deformation of the active stretchable seal, thereby resulting in the dynamic balance of air pressure in an enclosed space at least defined by the passive stretchable element and the active stretchable seal, and wherein the passive stretchable element is a flexible capsule connected to an ambient environment.

2. The sexual stimulation device of claim 1, wherein the passive stretchable element is configured to prevent the movement of the first stimulation element from being hindered due to an air pressure imbalance.

3. The sexual stimulation device of claim 1, wherein an inner wall of the flexible capsule defines a chamber connected to the enclosed space, due to a volume of the chamber changing as air pressure within the enclosed space changes in response to deformation of the active stretchable seal, thereby resulting in expansion and contraction of the flexible capsule.

4. The sexual stimulation device of claim 3, wherein at least portion of the housing is concave and forms a groove having an opening communicating with the enclosed space at a bottom wall thereof, and wherein at least portion of the flexible capsule is disposed inside the groove and sealingly engaged to the bottom wall of the groove, thereby resulting the chamber being in communication with the enclosed space.

5. The sexual stimulation device of claim 1, wherein the active stretch seal is a bellows surrounding the relative movement part and extending or contracting as the first stimulation element moves.

6. The sexual stimulation device of claim 5, wherein the housing further comprises an annular element disposed about the active stretch seal and configured to contact a portion of the human body as the first stimulation element stimulates the sensitive area of the human body.

7. The sexual stimulation device of claim 6, wherein the annular element is flexibly and detachably mounted to the housing, and wherein a gap is defined by an inner wall of the annular element and the bellows and the gap is configured to accommodate a folded wall of the bellows as the bellows contracts.

8. The sexual stimulation device of claim 1, wherein the first stimulation element comprises a stimulation component, wherein the drive unit comprises power sources electrically connected to the stimulation component.

9. The sexual stimulation device of claim 8, wherein the first stimulation element is connected to the drive unit via a quickly assemble-disassemble structure.

10. The sexual stimulation device of claim 9, wherein the sexual stimulation device further comprises two sets of electrically conductive assemblies, wherein one set of an electrically conductive contact of the electrically conductive assembly is disposed at the drive unit and is electrically connected to the power source, and another set of the electrically conductive contact of the electrically conductive assembly is disposed at the first stimulation section and is electrically connected to the stimulation component; and wherein the two sets of conductive contacts touch one another when the first stimulation element is connected to the drive unit via the quick assemble-disassemble structure, thereby conducting power from the power source to the stimulation component.

11. The sexual stimulation device of claim 10, wherein the first stimulation element is a dildo or an artificial vagina, and the stimulation component includes a vibration motor and/or a heating element.

12. The sexual stimulation device of claim 1, wherein the enclosed space is defined by the active stretchable seal and the passive stretchable element, or wherein the enclosed space is defined by the housing, the active stretchable seal, and the passive stretchable element.

13. The sexual stimulation device of claim 1, wherein the enclosed space is airtight and/or watertight so as to impede liquid penetration into the drive unit inside the housing.

14. A sexual stimulation device, comprising:

an active stretchable seal disposed at a first end of a body portion, the active stretchable seal creating a pressure as it moves;

a drive unit moving the active stretchable seal;

a passive stretchable element disposed at a second end of the body portion;

the active stretchable seal configured to deform with the movement of a first stimulation element, and the passive stretchable element configured to deform passively due to the deformation of the active stretchable seal, thereby resulting in the dynamic balance of air pressure in an enclosed space at least defined by the passive stretchable element and the active stretchable seal, and a pressure pathway carrying the pressure created by the active stretchable seal to the passive stretchable element such that the total pressure within the active stretchable seal, passive stretchable element, and the pressure pathway stays relatively stable as the active stretchable seal moves;

wherein the passive stretchable element is a flexible capsule connected to an ambient environment.

15. The sexual stimulation device of claim 14, wherein a stimulator appendage is connected to the active stretchable seal such that the stimulator appendage moves with respect to the body portion.

16. The sexual stimulation device of claim 14, wherein the movement of the active stretchable seal is a reciprocating movement.

17. The sexual stimulation device of claim 14, wherein the passive stretchable element is disposed within a cavity of the body that is hermetically sealed from the drive unit and the active stretchable seal, and this cavity is open to ambient environment by one or more openings in a housing of the body.

* * * * *